Oct. 27, 1936. J. C. PISTILLI Re. 20,148

BELTING

Original Filed Nov. 20, 1934

Joseph C. Pistilli, INVENTOR

BY Victor J. Evans & Co.

ATTORNEY

WITNESS: P. J. Hickey

Reissued Oct. 27, 1936

Re. 20,148

UNITED STATES PATENT OFFICE 20,148

BELTING

Joseph Charles Pistilli, Meriden, Conn.

Original No. 2,016,973, dated October 8, 1935, Serial No. 754,000, November 20, 1934. Application for reissue February 28, 1936, Serial No. 66,311

3 Claims. (Cl. 74—237)

The invention relates particularly to a polishing belt.

The primary object of the invention is the provision of a belt of this character, wherein the same is composed of wire mesh screening and fabrics, these being arranged in a fashion so that the screening will be centrally located and the fabrics enveloping the same, while the edges of the screening are selvaged or reinforced to avoid leaving raw edges on the screening, and at the same time forming a crown at the intermediate portion of the belt between said edges of said screening.

Another object of the invention is the provision of a belt of this character, which is simple in its construction, thoroughly reliable and efficient in its purpose, novel in its make-up, strong, durable and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing.

Similar reference characters indicate corresponding parts throughout the several views in the drawing.

Figure 1:
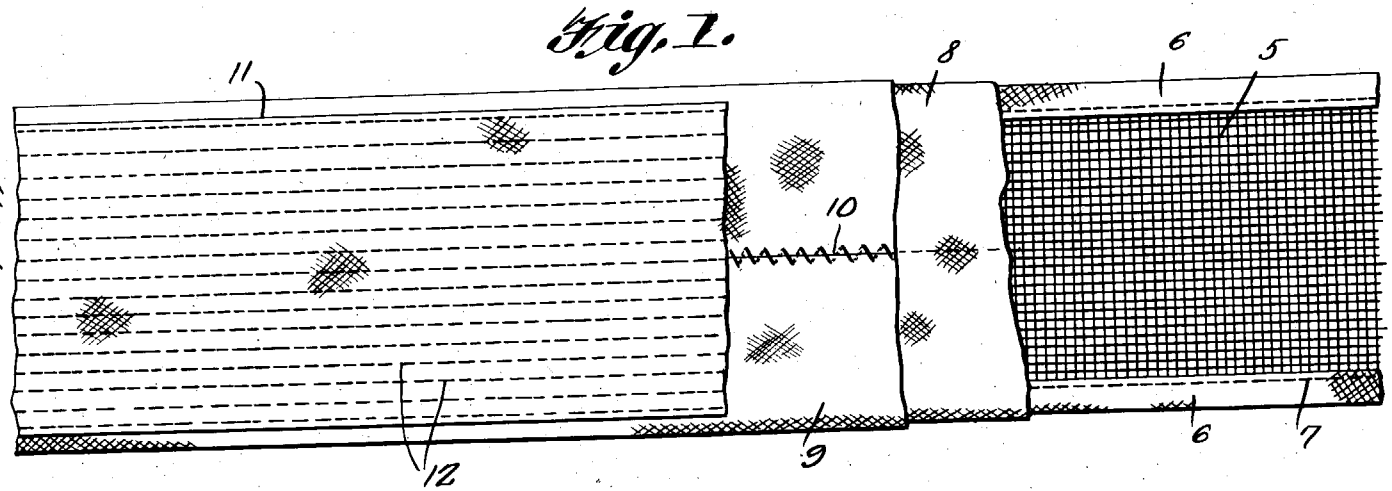
Figure 1 is a fragmentary plan view of a belt constructed in accordance with the invention, portions thereof being broken away to show the assembly of the screening and fabric making up the body of the belt.

Referring to the drawing in detail, the belt comprises a strip of wire mesh screening 5 having at its opposite longer edges a binding tape 6, this being turned over the finished or selvaged edges of the screening 5 and made secure by thread stitches 7 longitudinally directed. These tapes 6 serve as an edge binding for the screening strip 5.

Figure 2:
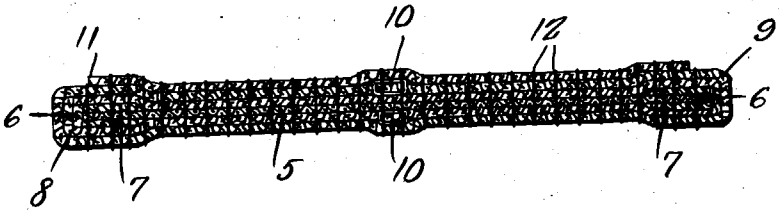
Figure 2 is an enlarged vertical sectional view through the belt.

Enveloping the screening strip 5 are the fabric stretches 8 and 9, respectively, the longitudinal edges of each meeting one another, as at 10, the meeting edges of one stretch being at one side of the screening strip 5, while the meeting edges of the other stretch are at the opposite side of said screening strip, as will be clearly apparent in Figure 2 of the drawing, and these meeting edges 10 of the stretches are at the longitudinal center line of the strip 5.

Applied to the outer stretch 9 is a fabric strip 11, its width being slightly less than the width of the belt under the complete assembly thereof, and such strip 11 is made fast by spaced parallel rows of thread stitches 12, these being passed through the stretches 8 and 9 and the interstices of the wire mesh screening 5, as will be clearly apparent from Figure 2 of the drawing.

It should be obvious that maximum strength is had under the assembly of the belt and longevity is assured, the belt under such assembly being adapted for polishing purposes.

The meeting edges of the stretches 8 and 9 are joined together by thread stitches.

What is claimed is:

1. A belt of the character described comprising a wire mesh screening strip, fabric tapings at the longitudinal edges thereof to constitute bindings thereto, fabrics enveloping the said strip, and a fabric strip carried exteriorly of the outermost fabric.

2. A belt of the character described comprising a wire mesh screening strip, fabric tapings at the longitudinal edges thereof to constitute bindings thereto, fabrics enveloping the said strip, a fabric strip carried exteriorly of the outermost fabric and longitudinal stitches extending through the fabric strip, the said fabrics and the screening strip.

3. A belt of the character described comprising a wire mesh screening strip, fabric tapings at the longitudinal edges thereof to constitute bindings thereto, fabrics enveloping the said strip, a fabric strip carried exteriorly of the outermost fabric, and longitudinal stitches extending through the fabric strip, the said fabrics and the screening strip and disposed in parallel relation to each other throughout the length of the belt.

JOSEPH CHARLES PISTILLI.